(12) United States Patent
Einstein et al.

(10) Patent No.: US 6,906,804 B2
(45) Date of Patent: Jun. 14, 2005

(54) WDM CHANNEL MONITOR AND WAVELENGTH LOCKER

(75) Inventors: David S. Einstein, Morganville, NJ (US); Anatoliy Marhelyuk, Middletown, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 228 days.

(21) Appl. No.: 10/320,065

(22) Filed: Dec. 16, 2002

(65) Prior Publication Data

US 2004/0114149 A1 Jun. 17, 2004

(51) Int. Cl.[7] .............................. G02B 9/02; H04B 10/12
(52) U.S. Cl. ........................................ 356/484; 398/196

(58) Field of Search .......................... 356/484; 398/196, 398/204, 209

(56) References Cited

U.S. PATENT DOCUMENTS

| 5,943,132 A | * | 8/1999 | Erskine ...................... 356/484 |
| 6,590,666 B2 | * | 7/2003 | Baney et al. ................ 356/484 |
| 6,687,006 B2 | * | 2/2004 | Pering et al. ................ 356/451 |

* cited by examiner

Primary Examiner—Gregory J. Toattey
Assistant Examiner—Patrick Connolly

(57) ABSTRACT

A method and apparatus for monitoring and controlling each of at least one optical signal sources within a WDM system by using beat frequencies derived by combining portions of the optical signals provided by the optical signal sources and a reference optical signal.

20 Claims, 4 Drawing Sheets

WDM CHANNEL MONITOR AND WAVELENGTH LOCKER

FIELD OF INVENTION

The invention relates generally to communications systems and, more specifically, to a method and apparatus for monitoring and controlling each of at least one optical signal sources within a WDM system by using beat frequencies derived by combining portions of the optical signals provided by the optical signal sources and a reference optical signal.

BACKGROUND OF INVENTION

Existing wavelength division multiplex (WDM) systems comprise individual transmitters with laser sources and data modulators which provide respective optical signals that are multiplexed together and transported via an optical fiber. Each individual transmitter has a laser source and a controller that measures and corrects the laser frequency and power. This controller, sometimes termed a wavelength locker, controls the resulting optical signal and effectively determines the long and short-term stability of the laser.

Where there is a need to increase the desired laser stability, to offset the laser frequency or to change optical channel spacing, then the individual transmitter must be replaced with one having the appropriate characteristics. In addition, since individual transmitters typically establish an operating frequency without knowledge of the exact frequency of an adjacent channel, the exact channel spacing uncertainty is equal to the uncertainty of the individual transmitter frequency multiplied by two. In addition, individual channel spacing can vary across the frequency band.

Multiple transmitters in WDM systems are followed by a channel multiplexer, which combines multiple fiber inputs into a single output fiber carrying all the channels at the same time, where each channel occupies a respective spectral region.

Since multiplexer channel spacing is matched to the channel spacing of the individual lasers, the manufacturing or operating tolerances may result in less than a perfect channel spacing match.

SUMMARY OF THE INVENTION

These and other deficiencies of the prior art are addressed by the present invention of a method and apparatus for monitoring and controlling each of at least one optical signal sources within a WDM system by using beat frequencies derived by combining portions of the optical signals with a reference optical signal.

Specifically, a method according to one embodiment of the invention comprises combining portions of each of a plurality of optical signals with a reference optical signal to produce a combined optical signal, where each of the plurality of optical signals has a respective wavelength; determining, using beat frequencies associated with the combined optical signal, a spectral offset between at least one of said plurality of optical signals and the reference optical signal; and adapting the at least one optical signal in response to the determined spectral offset.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The subject invention will be primarily described within the context of a wavelength division multiplex (WDM) system. However, it will be appreciated by those skilled in the art that the invention may be advantageously employed in any system in which optical signal adjustments are desired.

Figure 1:
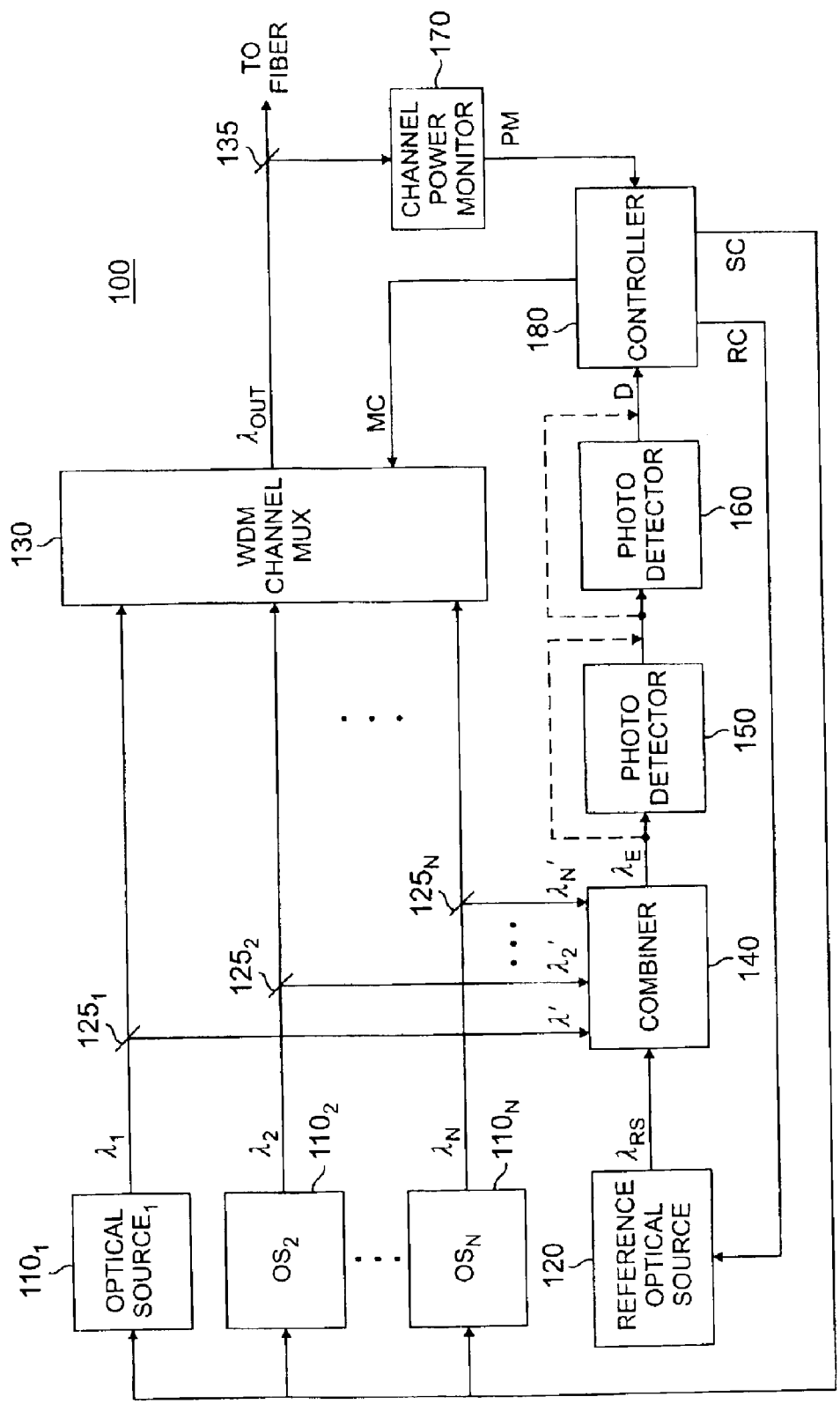
FIG. 1 depicts a high-level block diagram of a WDM system according to an embodiment of the invention.

FIG. 1 depicts a high-level block diagram of a wavelength division multiplex (WDM) system according to an embodiment of the present invention. Specifically, the WDM system 100 of FIG. 1 comprises a plurality of optical signal sources $110_1$ through $110_N$ (collectively optical signal sources 110), a reference optical signal source 120, a WDM channel multiplexer 130, a power combiner 140, a first photo detector 150, a second photo detector 160, a channel power monitor 170 and a controller 180.

Each of the optical signal sources $110_1$ through $110_N$ produces a respective optical output signal $\lambda_1$ through $\lambda_N$ having a respective wavelength. Each of the optical output signals $\lambda_1$ through $\lambda_N$ is coupled to the WDM channel multiplexer 130 via respective splitters $125_1$ through $125_N$ (collectively splitters 125). Each of the splitters 125 diverts a portion of the respective optical signal passing therethrough (e.g., 1% of the optical power) to the combiner 140 as optical signal portions $\lambda'_1$ through $\lambda'_N$.

The reference optical signal source 120 produces an optical output signal $\lambda_{RS}$ which is coupled to the combiner 140. The combiner 140 combines the reference laser signal $\lambda_{RS}$ and the diverted optical signal portions $\lambda'_1$ through $\lambda'_N$ to produce a combined output signal $\lambda_\Sigma$. The combined optical signal $\lambda_\Sigma$ is passed through one or both of photodetectors 150 and 160 such that a detected signal D is coupled to the controller 180.

The optical signals $\lambda_1$ through $\lambda_N$ received by the WDM channel multiplexer 130 are multiplexed into a single output signal $\lambda_{OUT}$ which is propagated to an optical fiber or other device (not shown). A portion (e.g., 1%) of the output signal $\lambda_{OUT}$ provided by the WDM channel multiplexer 130 is diverted by a splitter 135 and received by the channel power monitor 170. The channel power monitor 170 provides an output signal PM to the controller 180 indicative of an optical power level of the output signal provided by the WDM channel multiplexer 130.

The controller 180 is used to manage various operations of the WDM system 100. The controller 180 performs various processing and analysis operations based upon the detector signal D and/or power monitor signal PM. The controller 180 optionally produces a first control signal MC which is coupled to and adapted to control the operation of the WDM channel multiplexer 130. The controller 180 optionally produces a second control signal RC which is coupled to and adapted to control the operations of the reference optical signal source 120. The controller 180 optionally produces a third control signal SC which is coupled to and adapted to control the operations of the optical signal sources 110. In different embodiments of the invention which will be described in more detail below, the controller 180 uses different combinations (or none) of the control signals MC, RC and SC. An embodiment of the controller 180 will be described in more detail below with respect to FIG. 2.

The output signal $\lambda_\Sigma$ provided by the combiner 140 comprises a combination of the WDM laser source frequencies ($f_1, f_2 \ldots f_N$) and the frequency of the reference signal ($f_{RS}$). This combined signal, when applied to one or both of the photodetectors 150/160, produces a photodetector output signal D primarily comprising beat frequencies between each of the individual input frequencies (e.g., $f_1 \pm f_2, f_1 \pm f_3 \ldots f_1 \pm f_N, f_1 \pm f_{RS}, f_2 \pm f_3, \ldots$). The controller 180 operates to measure these beat frequencies and determine therefrom various parameters such as the offset of the WDM laser source frequency (i.e., $\lambda_1$ through $\lambda_N$) with respect to the reference frequency (i.e., $\lambda_{RS}$). Optionally, the controller 180 provides feedback to the optical signal sources 110 which enable the optical signal sources 110 to correct for any WDM laser frequency, phase, amplitude and the like outside a desired operating window, determine if a specific WDM channel is on or off and so on.

It is noted that if the signal power of the reference optical signal $\lambda_{RS}$ is significantly higher than the signal power of the optical signals with which it is combined, then substantially only the beat frequencies between the reference signal $\lambda_{RS}$ and each of the individual WDM signal portions $\lambda'_1$ through $\lambda'$ will be of significant power. To the extent that the beat frequencies exhibit power levels and/or spectral locations inconsistent with an expected power and/or spectral profile, the deviations from the expected power levels and or spectral location are used to adapt the optical signal. In this manner, the optical signal spectral offsets and/or power levels may be adjusted in a closed loop system or by a periodic sample and adjust process. A power and/or spectral profile may be constructed using empirical data provided during a known "good" state or by calculation using, for example, the optical properties of the various media, the initial spectral assignments of the optical signals and the like.

Figure 4:
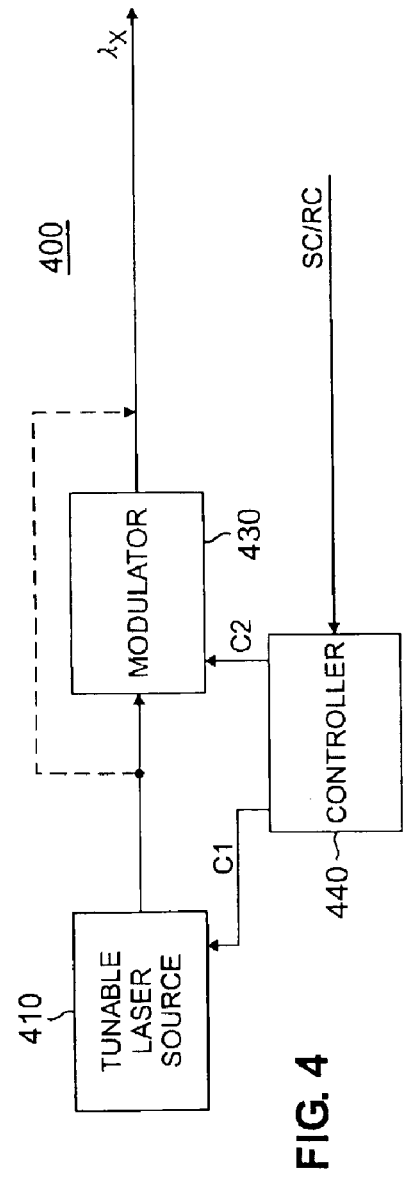
FIGS. 4–5 depict high level block diagrams of exemplary optical sources.

FIG. 4 depicts a high level block diagram of an exemplary optical source 400 suitable for implementing any of the optical sources 110 and reference optical source 120 discussed above with respect to FIG. 1. Specifically, the optical source 400 of FIG. 4 comprises a tunable laser source 410, an optional modulator 430 and a controller 440. The tunable laser source 410 produces an optical output signal having a controllable frequency and power parameter. The optical signal produced by the tunable laser source 410 may comprise a continuous wave (CW), pulsed or other optical signal. The tunable laser source 410 is responsive to a control signal provided by the controller 440 to adjust various parameters of the produced optical signal.

The optional modulator 430, in response to a control signal C2 provided by the controller 440, modulates the optical signal produced by the tunable laser source 410. The modulator 430 may be used to modulate a code word, data and/or any other type of signal onto the optical signal produced by the tunable laser source 410. As shown in dashed line format, the modulator 430 may be bypassed such that the output of the tunable laser source 410 is coupled directly to an output as an optical waveform of $\lambda_x$.

The controller 440 is responsive to a control signal SC (in the case of implementation as an optical source 110) or RC (in the case of implementation as reference optical source 120). The control signal SC/RC is interpreted by the controller 440 as a command to adjust at least one of a frequency parameter, phase parameter, amplitude parameter, pulse width parameter, pulse spacing parameter and the like, which parameters may optionally be controlled by the tunable laser source 410. The control signal SC/RC may also be interpreted by the controller 440 as a command to implement a modulator function, such that the modulator 430 is caused to impart a code word modulation, phase modulation, frequency modulation, amplitude modulation or other form of modulation to the optical signal produced by the tunable laser source 410. In this case, the output of the modulator 430 comprises the output of the optical source 110 or reference optical source 120 as $\lambda_x$.

In code word modulation embodiments, the controller 440 and/or the modulator 430 store a code word which is used to modulate the output of the tunable laser source 410. The code word may be periodically updated via an external communications bus (not shown) cooperating with the controller 440.

Figure 5:
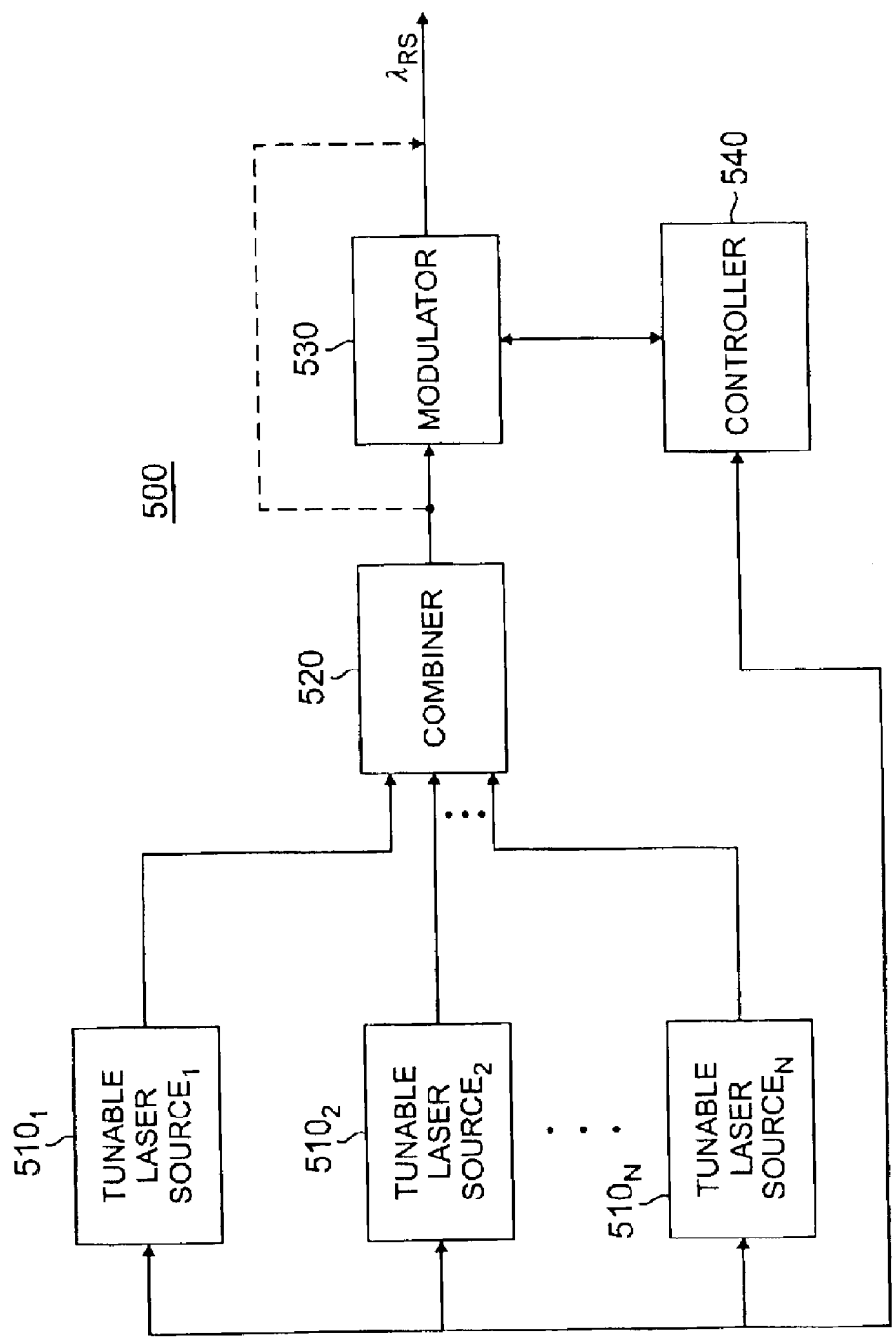

FIG. 5 depicts a high level block diagram of an optical source, illustratively a reference optical source 500 according to this embodiment of the invention. Specifically, the optical source 500 of FIG. 5 comprises a plurality of tunable laser sources $510_1$–$510_N$ (collectively tunable laser sources 510), a combiner 520, an optional modulator 530 and a controller 540. Each of the tunable laser sources 510 is selected, in this embodiment, to produce an optical output signal having a respective wavelength. The number of tunable laser sources 510 employed, and their respective wavelengths, is selected to cause the beat frequencies in the signal produced by the combiner 140 of FIG. 1 to fall within the bandwidth of photodetectors 150/160. Thus, in the case of ten optical sources 110 being employed within the system 100 of FIG. 1, the reference optical source 120 according to this embodiment of the invention utilizes ten tunable laser sources 510 (i.e., N=10), where each of the tunable laser sources 510 produces an optical output signal having a wavelength adapted to cause a beat frequency of a corresponding optical source 110 optical output signal to fall within the bandwidth abilities of the photodetectors 150 and/or 160.

The optical output signal produced by the tunable laser sources 510 is combined by the combiner 520 and optionally modulated by the modulator 530 prior to being output as, illustratively, a reference optical signal $\lambda_{RS}$. The controller 540 optionally communicates with the tunable laser sources 510 to control various parameters, such as discussed above with respect to the tunable laser source 112 of FIG. 4. Similarly, the controller 540 may control the optional modulator 530 to implement various modulator functions, such as discussed above with respect to modulator 114 of FIG. 4.

In one embodiment of the invention, the controller 180 of FIG. 1 operates to tune one or both of the WDM channel multiplexer 130 and optical signal sources 110 so that at least one of the combined and individual channel power at the multiplexer output can be maximized. That is, the controller 180 processes the beat frequency information derived from the detectors 150/160 to determine the relative power and/or spectral spacing of the output signals provided by the optical signal sources 110. Upon determining that a spacing and/or power mismatch exists, the controller 180 causes, via the feedback signal SC, one or more of the optical sources 110 to adjust the frequency and/or power level of its respective output signal $\lambda_x$. In this manner, multiplexer channel frequencies and channel spacing are adapted to substantially match WDM channel frequencies and spacing such that minimum losses and minimum transmitted signal distortion is achieved.

In one embodiment of the invention, the optical reference signal $\lambda_{RS}$ is modulated with a code word and the controller 180 implements a correlation detector function which processes the detected combined optical signal to derive therefrom a processing gain. That is, operational characteristics associated with the reference optical source 120 may be determined by isolating spectral contributions of the reference optical source 120 using the correlation detector function. Appropriate modifications to the reference optical source 120 operational parameters may then be affected by the controller 180 using the control signal RC.

In one embodiment of the invention, the signal produced by each of the individual optical signal sources 110 is modulated with one of a common or respective code word and the controller 180 implements a correlation detector function. In this embodiment, the reference signal to channel signal beat frequency product is distinguished with channel-to-channel beat frequency product with some processing gain, and each channel beat frequency with reference signal has a unique modulation pattern such that individual channels may be processed by the controller 180.

In one embodiment of the invention, the reference signal $\lambda_{RS}$ is replaced with a signal comprising multiple frequencies, such that substantially all desired beat frequencies will fall into the bandwidth of the photodetectors 150/160. This embodiment may also be modified to enable the use of a photodetector having a relatively low bandwidth (e.g., an inexpensive photodetector).

In one embodiment of the invention, the reference optical signal source 120 produces a continuous wave (CW) laser signal having phase, frequency and/or amplitude modulation at a rate equal to a desired channel spacing. In this embodiment, the beat signal frequency between the channel representative optical signals and the reference signal is the same frequency where the channel spacing is equal to the modulation frequency. In another embodiment, the phase, frequency and/or amplitude modulation of the CW laser signal is performed at a rate less than or above the desired channel spacing such that the beat signal frequency between channels and reference signal is different for each of the channels and, therefore, the channel frequencies may be individually analyzed.

In one embodiment of the invention, the controller 180 includes a signal processing function having a bank of radio frequency (RF) bandpass filters followed by detectors, such that the filter(s) bandwidth and center frequency define desired tolerance of each or all of the individual channel frequencies and the boundary of acceptance thereof.

In one embodiment of the invention, the WDM reference signal $\lambda_{RS}$ is combined with the WDM channel signal portions $\lambda'_1$ through $\lambda'_N$ and transmitted via, for example, an optical fiber to a subsequent device such as an optical add/drop multiplexer (OADM). In this manner, the subsequent device can be locked precisely to the same reference.

In one embodiment of the invention, the WDM reference signal is placed in channel gaps for lowest possible interference with transmitted channels and, therefore, avoids the use of extra bandwidth.

In one embodiment of the invention, a device is provided in which the WDM reference signal $\lambda_{RS}$ is combined with the WDM channel frequencies $\lambda'_1$ through $\lambda'_N$ and transmitted through the fiber, received at the end terminal or OADM, and transmitted back and/or to other nodes such that all laser sources in the WDM system are locked to the same reference.

Figure 2:
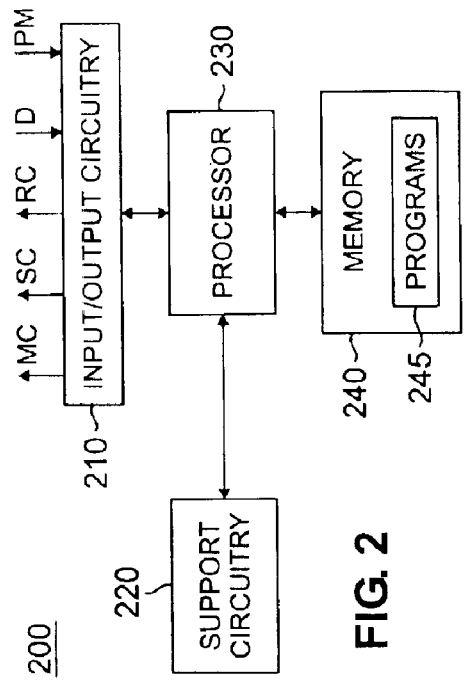
FIG. 2 depicts a high-level block diagram of a controller suitable for use in the WDM system of FIG. 1.

FIG. 2 depicts a high-level block diagram of a controller suitable for use in the WDM system 100 of FIG. 1. Specifically, the controller 200 of FIG. 2 comprises a processor 230 as well as memory 240 for storing various control programs 245. The processor 230 cooperates with conventional support circuitry 220 such as power supplies, clock circuits, cache memory and the like as well as circuits that assist in executing the software routine stored in the memory 240. As such, it is contemplated that some of the process steps discussed herein as software processes may be implemented within hardware, for example as circuitry that cooperates with the processor 230 to perform various steps. The controller 200 also contains input/output (I/O) circuitry 182 that forms an interface between the various functional elements communicating with the controller 200.

Although the controller 200 of FIG. 2 is depicted as a general-purpose computer that is programmed to perform various control functions in accordance with the present invention, the invention can be implemented in hardware as, for example, an application specific integrated circuit (ASIC). As such, the process steps described herein are intended to be broadly interpreted as being equivalently performed by software, hardware or a combination thereof.

The above-described controller 200 of FIG. 2 may be advantageously employed within the context of the controller 180 of FIG. 1, the controller 440 of FIG. 4 and/or the controller 540 of FIG. 5. The programs 245 stored within the memory 240 are adapted in accordance with the controller implemented using the controller 200 of FIG. 2. It is noted that the IO circuitry 210 depicted in FIG. 2 is in communication with various signals such as depicted in FIG. 1 with respect to the controller 180. For example, in the embodiment of FIG. 1, the controller 200 optionally communicates with the WDM channel multiplexer 130 (via first control signal MC), with the reference optical signal source 120 (via second control signal RC) and with the optical signal sources 110 (via third control signal SC). The controller 200 also receives an input signal D from one or both of the photodetectors 150 and 160. The controller 200 optionally receives an input signal PM from the channel power monitor 170. It will be appreciated by those skilled in the art that the actual signal paths in communication with the IO circuitry 210 will vary depending upon whether the controller 200 of FIG. 2 is implementing the controller 180 of FIG. 1, the controller 440 of FIG. 4 or the controller 540 of FIG. 5.

Figure 3:
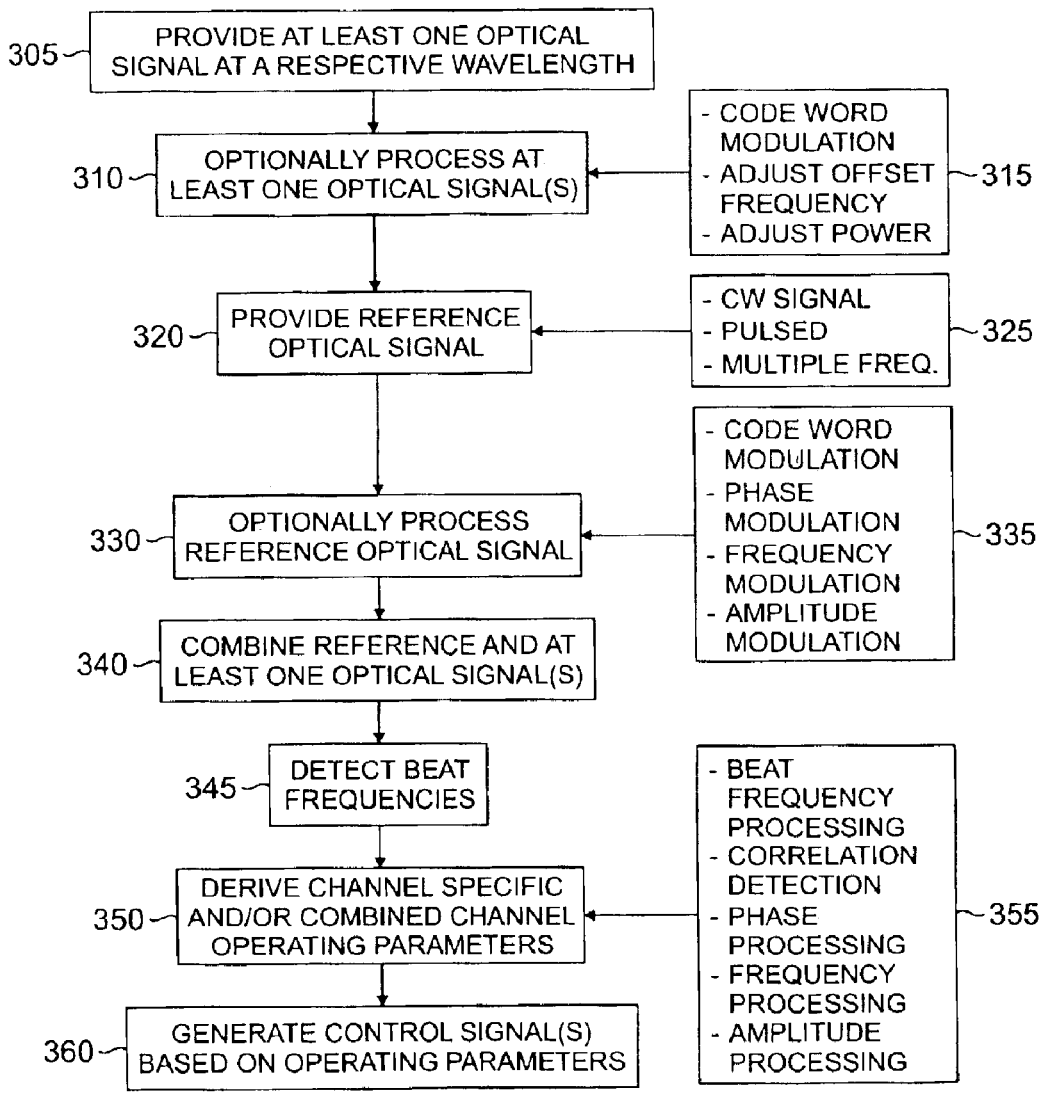
FIG. 3 depicts a flow diagram of a method according to an embodiment of the present invention.

FIG. 3 depicts a flow diagram of a method according to an embodiment of the present invention. Specifically, FIG. 3 depicts a flow diagram of a method 300 which is entered at step 305 when at least one optical signal at a respective wavelength is provided.

At step 310, one or more of the at least one optical signals are optionally processed by, per box 315, code word modulation, frequency offset adjustment, power adjustment and the like.

At step 320, an optical reference signal is provided. The provided optical reference signal may comprise, per box 325, a continuous wave signal, a pulsed signal, a multiple frequency signal and the like.

At step 330, the provided optical reference signal is optionally processed by, per box 335, code word modulation, phase modulation, frequency modulation, amplitude modulation and the like.

At step 340, the reference optical signal (optionally processed or as provided) and the at least one optical signal (optionally processed or as provided) are combined to form a combined optical signal.

At step 345, the combined optical signal is processed to detect beat frequency parameters. At step 350, channel specific and/or combined channel operating parameters are derived according to, per box 355, beat frequency processing, correlation detection, phase processing, frequency processing, amplitude processing and/or other processing techniques. At step 360, one or more control signals are generated based upon the operating parameters derived at step 350. These control signals, while not strictly necessary to practice the invention, are adapted to modify the operating parameters of any of a source of the initially provided at least one optical signal, a source of the reference optical signal, and/or a multiplexer which may be used to multiplex the initial or processed optical signals to form thereby an output optical signal.

In one embodiment, a closed loop correction of optical signals is effected by using a combiner, for combining portions of each of at least one optical signal with a reference optical signal to produce a combined optical signal and a signal processor, for measuring beat frequencies associated with the combined optical signal and determining therefrom a spectral offset between the at least one optical signal and the reference optical signal. The signal processor communicates toward an optical signal source indicia of the determined spectral offset such that spectral adaptations may be effected in a closed loop manner by, for example, an optical signal source.

Although various embodiments that incorporate the teachings of the present invention have been shown and described in detail herein, those skilled in the art can readily devise many other varied embodiments that still incorporate these teachings.

What is claimed is:

1. A method, comprising;

combining portions of each of a plurality of optical signals with a reference optical signal to produce a combined optical signal, each of said plurality of optical signals having a respective wavelength;

determining, using beat frequencies associated with said combined optical signal, a spectral offset between at least one of said plurality of optical signals and said reference optical signal; and adapting said at least one optical signal in response to said determined spectral offset.

2. The method of claim 1, wherein each of said optical signals is generated by a respective optical source, and said step of adapting comprises:

adapting the operation of at least one of said optical sources to effect an adaptation in the corresponding at least one optical signal.

3. The method of claim 1, wherein said step of adapting comprises at least one of changing a phase parameter, changing a frequency parameter and changing an amplitude parameter of said at least one optical signal.

4. The method of claim 1, further comprising:

modulating at least one of said plurality of optical signals according to a respective code word;

said step of determining including identifying an optical signal contributor to a beat frequency by detecting a corresponding modulated code word.

5. The method of claim 1, wherein said reference optical signal comprises one of a continuous wave optical signal, a pulsed optical signal and a multiple frequency optical signal.

6. The method of claim 1, further comprising:

determining operating parameters associated with at least one of a plurality of optical channels supporting said optical signals;

wherein at least some of said determined operating parameters are used to adapt said at least one optical signal.

7. The method of claim 1, further comprising:

adapting at least one additional optical signal in response to said determined spectral offset.

8. The method of claim 7, further comprising:

determining operating parameters associated with at least one of a plurality of optical channels supporting said optical signals;

wherein at least some of said determined operating parameters are used to adapt said at least one additional optical signal.

9. The method of claim 1, wherein said step of determining comprises comparing a spectral parameter of said combined optical signal to a spectral profile to identify thereby spectral deviations.

10. The method of claim 1, wherein said step of determining comprises comparing a power parameter of said combined optical signal to a power profile to identify thereby spectral deviations.

11. Apparatus, comprising:

a plurality of transmitters, each of said transmitters comprising an optical source producing an optical signal at a respective wavelength;

a combiner, for combining a reference signal and a portion of each of said optical signals to produce a combined optical signal; and at least one optical detector, for detecting beat frequencies associated with said combined optical signal, said beat frequencies indicative of a spectral offset between said optical signals and said reference optical signal; and a controller, responsive to said at least one optical detector, for adapting the operation of at least one of said transmitters to modify thereby the spectral offset between a corresponding optical signal and an adjoining optical signal.

12. The apparatus of claim 11, further comprising:

a plurality of splitters, for directing said portion of each of said modulated optical signals to said combiner.

13. The apparatus of claim 11, further comprising:

a multiplexer, for multiplexing said optical signals to produce an output signal; and a channel power monitor, for measuring a portion of said output signal to determine thereby an output signal power level;

said controller being responsive to said channel power monitor for adapting the operation of at least one of said transmitters.

14. The apparatus of claim 11, wherein each of said transmitters further comprises:

a modulator, for modulating the respective optical signal produced by the transmitter.

15. The apparatus of claim 14, wherein:

at least one of said modulators operates to modulate its respective optical signal according to a respective code word;

said controller identifying said modulated code word to identify the source of spectral contributions to said combined optical signal.

16. The apparatus of claim 14, wherein:

at least one of said modulators operates to modulate its respective optical signal according to a respective code word;

said controller identifying said modulated code word to identify the source of spectral contributions to said combined optical signal.

17. The apparatus of claim 16, wherein said controller identifies said at least one code word modulated optical signal using correlation.

18. The apparatus of claim 11, wherein at least a spectral parameter of said beat frequencies are compared to a spectral profile to identify thereby spectral deviations.

19. The apparatus of claim 11, wherein at least a power parameter of said beat frequencies are compared to a power profile to identify thereby spectral deviations.

20. Apparatus, comprising:

a combiner, for combining portions of each of at least one optical signal with a reference optical signal to produce a combined optical signal; and a signal processor, for measuring beat frequencies associated with said combined optical signal and determining therefrom a spectral offset between said at least one optical signal and said reference optical signal;

said signal processor communicating toward an optical signal source indicia of said determined spectral offset such that spectral adaptations may be effected in a closed loop manner.

* * * * *